United States Patent [19]

Douglas

[11] Patent Number: 4,582,426
[45] Date of Patent: Apr. 15, 1986

[54] OPTICAL RADIATION PYROMETER

[75] Inventor: Joseph Douglas, Skipton, England

[73] Assignee: Rolls-Royce Limited, London, England

[21] Appl. No.: 556,320

[22] Filed: Nov. 30, 1983

[30] Foreign Application Priority Data

Dec. 24, 1982 [GB] United Kingdom ............... 8236764

[51] Int. Cl.$^4$ .............................................. G01J 5/08
[52] U.S. Cl. ....................................... 356/43; 356/44; 374/121; 374/130
[58] Field of Search ................. 356/43, 44, 45, 46, 356/47, 48, 49, 50; 374/121, 122, 17, 125, 130; 415/118; 250/237 R

[56] References Cited

U.S. PATENT DOCUMENTS

| | | | |
|---|---|---|---|
| 2,627,202 | 2/1953 | Strong et al. | 356/43 |
| 3,441,348 | 4/1969 | Nichols et al. | 356/43 |
| 4,081,215 | 3/1978 | Penney et al. | 356/45 |
| 4,306,835 | 12/1981 | Hurley | 356/43 X |
| 4,326,798 | 4/1982 | Kahn | 356/43 X |

FOREIGN PATENT DOCUMENTS 0557272  2/1979  U.S.S.R. ................. 356/43

Primary Examiner—Vincent P. McGraw
Assistant Examiner—Robert D. V. Thompson, III
Attorney, Agent, or Firm—Cushman, Darby & Cushman

[57] ABSTRACT

To be of most use as an input signal for the control system of a gas turbine aeroengine, a pyrometer-derived turbine blade temperature signal should represent the average temperature of the hottest parts of the blades with fast and accurate response when the average temperature of the hottest parts changes with engine conditions. The invention achieves this by providing the pyrometer with an optical system adapted to give the pyrometer's photo-diode a large field of view which is rectangular at the face of the turbine rotor and which extends an integer number of inter-blade passage widths in the circumferential direction and a portion of the length of the blade aerofoils in the radial direction. The large rectangular field of view is achieved by masking the optical system and arranging that it cooperates with a small aperture in the wall of the turbine gas passage in such a way that at the aperture the field of view lies entirely within the boundary of the aperature, the field of view expanding out of the aperture to produce the required rectangular field of view at the face of the turbine rotor.

16 Claims, 3 Drawing Figures

OPTICAL RADIATION PYROMETER

The present invention relates to an optical radiation pyrometer suitable for viewing the blades of an axial flow gas turbine rotor within a gas turbine engine. In particular it relates to such a pyrometer capable of producing a signal which is particularly—but not exclusively—suitable as an input signal for a fuel control system of a gas turbine engine.

To be of most use for calibration as an input signal for the fuel control system of a gas turbine aeroengine, a radiance signal derived from a pyrometer viewing the high pressure turbine rotor blades should preferably correspond to the average radiance of the hottest parts of the blades and should have a fast and accurate response when the average radiance of said hottest parts changes with engine conditions, so that the fuel flow can be limited or trimmed by the control system in accordance with acceptable or optimum values of blade radiance (i.e., acceptable or optimum values of blade temperature).

It is known to provide a pyrometer in a gas turbine engine with an opto-electronic sensor element having a fast response to changes in blade radiance and a small field of view focussed at a radial location on the turbine rotor blades where the blades are likely to be hottest. Consequently, the radiation sensitive element scans a circumferentially extending thin strip of the rotor blades as they pass the pyrometer, variations of temperature across the chord of each blade, and variations between blades, being manifested in the output signal.

It is possible electronically to process the pyrometer output signal in order to obtain a signal which is a measure of the average radiance of the hottest parts of all the blades on the rotor at the chosen radial location, and this processed signal can be utilised as an input to the engine's fuel control system. However, a problem arises in that there is a tendency for the radial location of the hottest part of a blade to change with changes in engine operating conditions such as power and rotor speed, i.e. the regions of highest temperature tend to wander spanwise of the blade during an engine operating cycle. This means that there is a likelihood that at some engine conditions the pyrometer output signal will not be an accurate measure of the temperature of the hottest parts of the blades, and therefore if the pyrometer output signal is processed and utilised as a controlling parameter in the engine's fuel control system, it will introduce an error into the system with possible serious consequences in terms of reduced blade life and increased fuel burn. It is an object of the present invention to contribute to the solution of this problem by ensuring that the hottest parts of the blades are in the field of view of the radiation sensitive element at various important engine operating conditions.

A further problem is that the necessary electronic processing of the pyrometer output signal to obtain a signal which is a measure of the average peak radiance of the blades involves an undesirable complication in the electronic system, including the need by synchronise processing of the pyrometer output signal with the passage of blades through the field of view by clocking the pyrometer output signal with a rotor speed signal related to the passage of individual blades through the field of view. Yet another related problem is that the time necessary to perform the aforesaid electronic processing introduces a time-lag into the response of the fuel control system to changes in engine conditions; the more signal processing it is necessary to do, the less that the processed signal can be said to be a "real-time" signal. It is an object of the present invention to contribute to the solution of these problems by providing a pyrometer whose output signal requires a minimum of electronic processing to make it suitable as a control signal input to a fuel control system.

According to the present invention, an optical radiation pyrometer adapted for installation in a gas turbine engine for viewing turbine rotor blades therein has radiation-sensor means and an optical system incorporating masking means whereby the optical system is adapted to give the radiation-sensor means a field of view which is large and substantially rectangular at the face of the turbine rotor and whose edges extend substantially cicumferentially and radially of the turbine rotor so as to embrace respectively an integer number of inter-blade passage widths, and sufficient of the span of the blades to ensure that the hottest parts thereof are within said field of view at a plurality of preselected operating conditions of the engine, the line of sight of the installed optical system being oriented such that the field of view is filled by surfaces of the blades, whereby during operation of the turbine/pyrometer combination at said engine operating conditions, the output signal strength from the radiation sensor means is representative of the real-time average radiance of the hottest parts of said integer number of said blades (ignoring interference due to any other sources of radiation within the field of view).

Preferably, the integer number lies between one and three inclusive.

The field of view may embrace a minor proportion of the span of the blades such that the field of view is strip-like, if that is sufficient to ensure that said output signal strength is representative as aforesaid of the hottest parts of the blades. Alternatively the field of view may embrace a major proportion of the span of the blades if that is necessary to ensure that said output signal strength is representative as aforesaid of the hottest parts of the blades.

The optical system is preferably adapted to cooperate with a small aperture in the wall of the turbine gas path such that at the aperture the field of view lies entirely within the boundary of the aperture, the field of view expanding out of said aperture to produce the substantially rectangular field of view at the face of the turbine rotor.

Preferably, the radiation-sensor means comprises an opto-electronic sensor (such as a photodiode) situated remotely from the optical system, and an optical guide (such as fibre-optic cable) for channelling radiation to the opto-electronic sensor, the optical guide having a receptor end onto which radiation from the turbine blades is concentrated by the optical system.

The optical system may comprise the masking means and a lens for concentrating radiation from the turbine blades onto the radiation-sensor means.

The invention also includes a gas turbine engine incorporating an optical radiation pyrometer according to the above statements.

An embodiment of the invention will now be described by way of example only with reference to the accompanying drawings in which.

The drawings are not to scale.

Figure 1:
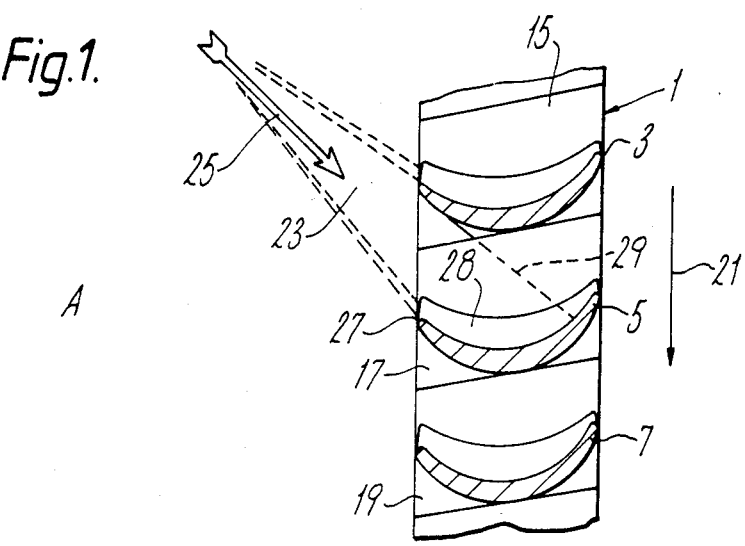
FIG. 1 is a developed plan view of a turbine rotor-blade stage showing the line of sight and field of view of a pyrometer according to the present invention.
Figure 2:
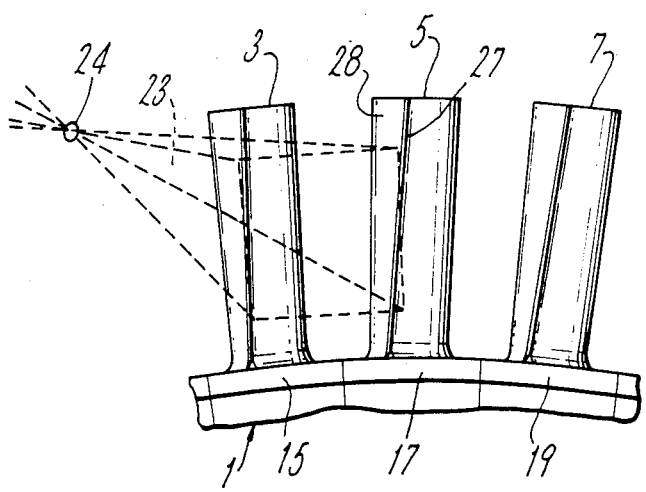
FIG. 2 is an elevation of the rotor as seen from side A in FIG. 1.

Referring now to FIGS. 1 and 2, there is shown a turbine rotor 1 having turbine blade aerofoils 3, 5 and 7 respectively which each project from a respective blade inner platform 15, 17 and 19. As the turbine rotor rotates in the direction of arrow 21, each turbine blade passes in turn through the field of view 23 of a pyrometer (not shown). The field of view 23 is defined between the mutually convergent dashed lines.

The pyrometer has an optoelectronic sensor which senses radiation at an infra-red wavelength and is installed so that it looks at the turbine blades through an aperture 24 (FIG. 2) in the radially outer platform of one vane in the preceding ring of nozzle guide vanes (not shown), the pyrometer's line of sight 25 (FIG. 1) being generally rearward from the nozzle guide vanes. The line of sight 25 is skewed relative to the axis of rotation so that the field of view 23 is centred on a median radial location of the blade aerofoils (i.e. on the hottest parts) and so that the leading edge 27 and a major portion of the concave flank 28 of each blade is visible to the pyrometer, the field of view being filled at all times by surfaces of the blades so that the pyrometer does not view objects or volumes beyond the blades. The dashed line 29 (FIG. 1) indicates the edge of the "shadow" cast in the pyrometer's view of flank 28 of aerofoil 5 by the convex flank of aerofoil 3.

As indicated, the field of view is rectangular at the face of the rotor, i.e. in the plane occupied by the leading edges of the aerofoils, though of course the actual areas of the aerofoil flanks viewed by the pyrometer are of a shape determined by the curvatures of the flanks and their distances from the aperture 24. The edges of the rectangle defining the field of view 23 at the face of the rotor extend in directions which substantially coincide with circumferential and radial directions, and its dimensions in the present embodiment are one inter-blade passage width (i.e. one whole width of one of the passages between the blades) as measured in the circumferential direction and about two-thirds of the blade aerofoil span as measured in the radial direction.

Remembering the tendency for the radial location of the hottest part of a blade to change with changes in engine operating conditions, it has been assumed in the present embodiment that the characteristics of the engine are such that it is necessary for the field of view 23 to embrace a major proportion of the blade span in order to ensure that the field of view includes the hottest parts of the blades at all, or at least a number of, engine operating conditions judged to be of sufficient importance to warrant active monitoring by the pyrometer. For an aero engine, such conditions could be the different power levels associated with takeoff, climb, cruise, cutback (when the aircraft is circling an airport whilst waiting to land), and landing.

The fact that the field of view embraces one inter-blade passage width ensures that at any instant during operation of the turbine pyrometer combination, the radiance of those blade-parts within the field of view 23 is representative of the hottest parts of a single blade.

It will now be seen that because of the shape and dimensions of the field of view 23, the average radiance of those blade parts within the field of view at any instant is acceptably close to, i.e. representative of, the average radiance of the hottest parts of a single blade. Since temperature variations as between blade and blade are generally quite small (except in the unusual case of a blockage or other malfunction in a blade's cooling system), it can also justifiably be said that the average radiance of those blade parts within the field of view at any instant is broadly representative of the average radiance of the hottest parts of all blades on the rotor.

It may be noted that at any given moment complementary parts of two blades are in fact within the field of view 23, but for obvious reasons this makes no difference to the above argument.

Considering now the effect which the radiant blade parts within field of view 23 have on the output signal from the pyrometer, it should be noted that the sensor element utilised is a photo-diode having a fast response to changes in blade radiance and having the property that its output signal at any moment is a measure of the average radiance of everything within its field of view 23 at the moment. Therefore, ignoring radiant interference due to combustion effects, the output signal from the pyrometer at any instant will be representative of the average radiance of the hottest parts of a single blade and broadly representative of the average radiance of the hottest parts of all the blades on the rotor.

The pyrometer optical system may be designed to give fields of view having different dimensions to the ones mentioned above. Hence, the radial extent of the field of view 23 may be chosen to be greater or much less than two-thirds of the span of the blade aerofoils, the criterion being whether sufficient of the span of the blades is embraced by the field of view to ensure that it includes the hottest parts of the blades at a number of engine operating conditions selected as being of sufficient importance to warrant ative monitoring by the pyrometer. Insofar as the circumferential extent of the field of view is concerned, it must always be an integer number of inter-blade passage widths so that at any moment the radiation-sensitive element is receiving radiation equivalent to that from an integer number of aerofoils and the pyrometer output signal remains at or near a true measure of the average radiance of the blades' hottest parts (ignoring radiant interference). This feature makes it unnecessary to synchronise processing of the pyrometer output signal with the passage of individual blades through the field of view, therefore simplifying the electronics. We have found that, taking into account various design constraints such as restricted space for installation of the pyrometer optical system, the short distance between the nozzle guide vane ring and the turbine rotor, and the diameter of the turbine rotor, the maximum practicable circumferential extent of the field of view is three inter-blade passage widths i.e. the integer number is between one and three inclusive. The advantage of a field of view which extends a plurality of inter-blade passage widths in the circumferential direction is of course that the photo-diode gives an output signal which at any moment (ignoring radiant interference) is representative of the average radiance of the hottest parts of a plurality of blades and therefore blade-to-blade radiance variations do not vary the strength of the signal as much as they would if the field of view included only the equivalent of one blade at any moment.

Another factor which should be taken into account is that a large field of view will inevitably include more radiant interference from the combustion process than would a small field of view, Hence, the spanwise dimension of the rectangular field of view should be the absolute minimum consistent with the hottest parts of the blades being included within it at the selected important engine operating conditions.

Figure 3:
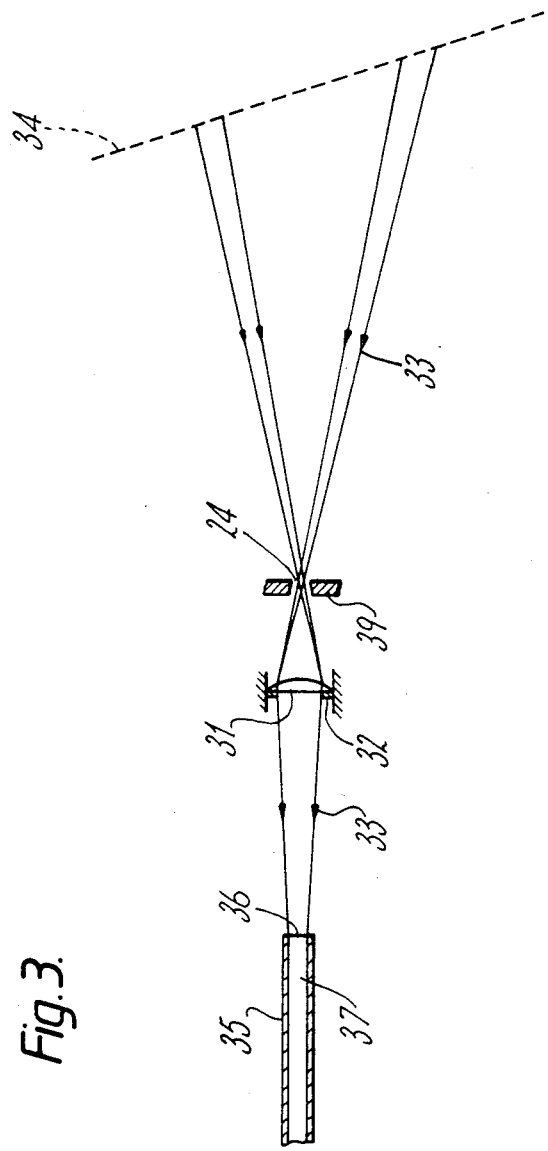
FIG. 3 is a diagrammatic sectional representation of an optical system for a pyrometer according to the present invention.

Referring now to FIG. 3, there is shown an optical system for the pyrometer which is capable of giving the photo-diode the required field of view. The optical system is sectioned along its optical axis and includes a lens element 31 which concentrates radiation 33 coming out of the face 34 of the rotor into the receptor end 36 of the fibre-optic bundle or core 37 of fibre-optic cable 35 which in turn channels the radiation onto the photo-diode (not shown) situated remotely from the rest of the optical system. The photodiode is given the rectangular field of view at the rotor face 34 by means of a suitably shaped mask 32 on lens 31. Lens 31 is located relative to a small aperture 24 in nozzle guide vane 39 such that if the receptor end 36 of the cable 35 were to be a light-emitter, it would focus an image of the receptor end 36 into the aperture as shown in FIG. 3. This focussed image in aperture 24 would be appreciably smaller than the aperture and its edges would lie well within the boundary of the aperture i.e. the field of view of the photodiode at the aperture is compressed to dimensions smaller than the aperture by lens 31, but the field of view expands out of the aperture until at the face 34 of the turbine rotor it is the required size and shape. Another way of looking at this is to say that aperture 24 is acting like a large pinhole in a pinhole camera to project blade radiation onto lens 31.

Note that if the lens 31 were to be suitably repositioned in accordance with the well-known optical laws, the aperture 24 could be used as a mask to control the shape of the field of view, instead of the mask 32. However, this would be undesirable because of the possibility of accretion of combustion products around the edges of the aperture, leading to progressive reduction of its dimensions and alteration in the field of view; hence the field of view at the aperture is contracted well within the boundary of the aperture in order to provide adequate allowance for the growth of an accretionary layer.

Due to the compound skew angle at which the axis of the optical system is oriented relative to the rotational axis of the face if the turbine rotor, it will be apparent that in order to produce a substantially rectangular field of view in the plane of the face of the turbine rotor, the mask 32 in lens 31 (FIG. 3) will not in fact be rectangular, but a shape which when projected into plane 34 by the optical system is rectangular.

The shape of the radiation-receptor end 36 of the fibre optic bundle or core 37 may be circular, but preferably it is moulded to match the mask 32 so that the boundary of the portion illuminated by the incoming radiation coincides with the boundary of the bundle or core. This ensures that the whole optical cross-section of cable 35 is utilised to channel radiation to the photodiode.

The edges of the field of view are not sharply defined at the face of the turbine rotor because the end of the fibre-optic cable 35 is focussed into aperture 24 rather than into the turbine rotor. However, definition is sufficient to ensure that the photodiode does not receive a substantial amount of radiation from blade portions which ideally should be outside its field of view. Hence, the radiance error introduced into the photo-diode signal is small.

The advantages inherent in achieving a large field of view for the pyrometer whilst using only a small aperture in the wall of the turbine gas passage are significant, in that contamination of the pyrometer lens system by the turbine gases is reduced, both by the restricted communication between the turbine gas passage and the interior of the component containing the lens system, and also by the fact that the small aperture can be purged with an accelerating high velocity clean flow of air into the gas passage, the air being supplied to a chamber between the front of the pyrometer lens system and the aperture at a pressure appreciably greater than the pressure in the gas passage. It is of course vital that the pyrometer lens system is kept clean if the pyrometer is to function reliably as part of the engine's control system.

At any instant, the output signal from the type of pyrometer described above can be regarded as comprising a component which is representative of the mean radiance of the hottest parts of an integer number of turbine blade aerofoils, plus an "interference" component due to intermittent effects from the combustion process such as radiation from the turbine gas stream or hot particles therein.

In order to be of use as an input signal for a fuel control system, the pyrometer output signal must therefore be processed to remove the interference. Several ways of performing this task are known. As an example of one of these, our British Pat. No. 1590835 describes a way of improving the accuracy of the radiance signal by digitising it and in effect filtering out spurious signal components which represent intermittent interference from combustion processes.

After removal of the interference by the filter function, the pyrometer signal can be further processed if necessary by smoothing it in order to remove excessive fluctuations caused by some aerofoils running hotter than others; one way of doing this utilising a digitised radiance signal is to read each successive data word from the filter function into a register capable of holding, say, five data words; the average value of the data words in the register is taken each time a new data word enters it and this moving average is the output of the smoothing function, i.e. its output is a data word which can be taken to be a measure of the true average radiance of all the aerofoils on the turbine rotor provided that the capacity of the register in the smoothing function is suitably chosen.

The output from the smoothing function could be the desired input signal for feeding to the engine control system if it is able to utilise radiance data, but if it is not able to do so, the output from the smoothing function would first be converted from values representing average radiance of the blades to values representing their average temperature. This would be done by means of a lineariser function in which successive radiance values are fitted to a predetermined radiance/temperature curve stored digitally in a memory, the equivalent temperatures being read out of the lineariser function into the control system.

Preferably, the digital filtering, smoothing and linearising functions would be carried out in a suitably programmed microprocessor.

In the above description, the photodiode's field of view at the rotor face 34 was said to be substantially rectangular. The ideal shape would in fact differ somewhat from a rectangle, depending upon the size of the turbine and the geometry of the turbine/pyrometer installation. However, for a field of view measuring only two or three inter-blade passage widths across (maximum) the ideal shape (which for example could be trapeizoidal) would be well approximated by a rectangle in any case, so that the difference between the ideal and the practical would not introduce serious errors into the control signal.

Bearing the above paragraph in mind, the shape of the field of view is important because if it departs too far from the ideal (as would, e.g. a circular field), it causes the radiant flux received by the photo-diode from the blades to vary by large amounts during their passage through the field, thereby imposing an unacceptably large cyclic fluctuation on the strength of the pyrometer output signal. Further electronic processing would then be required to remove the unwanted fluctuation.

Note that in the specification and claims, when the word "rectangular" is used in relation to the field of view, it includes shapes which approximate to a rectangle as mentioned in the preceding two paragraphs, and also square fields of view, a square being a particular type of rectangle.

Although in the above description the emphasis has been upon the production of an input signal for a fuel control system, the same signal could also be used as a blade temperature input signal for a blade life usage monitor. Note further that the unprocessed signal produced by the pyrometer (assuming an integer number of one) is suitable for use in the detection of overheated blades, the signal being passed through "peak-picking" circuitry (e.g. a high-pass filter) whose output is compared with a rotor speed signal so that overheated blades can be identified for maintenance attention. In addition, the peak-picking circuitry can be used to trigger generation of an alarm signal or automatic shut-down of the engine to avoid catastrophic overheating of a blade which could endanger the integrity of the engine.

I claim:

1. A radiance detection system including an optical pyrometer in a gas turbine engine, said engine having an annular wall for directing gases to the rotor blades of a turbine rotor, and said optical pyrometer being positioned in said engine for receiving radiation from said rotor blades, said radiance detection system comprising:

a small aperture formed in said annular wall of said engine;

a radiation sensor means for generating an output signal; and an optical means for directing radiation from said engine rotor blades onto said sensor means, said optical means including masking means for limiting the field of view of said radiation sensor means at said rotor blades to a substantially rectangular shape having edges extending substantially circumferentially and radially of said turbine rotor blades to cover an integer number of inter-blade passage widths and a sufficient radial span of the blades to ensure that the hottest portions thereof are within said field of view during a plurality of preselected operating conditions of said engine, said optical means being aligned with respect to said small aperture and the plane of said rotor turbine blades such that said field of view is filled by the surfaces of said blades, said field of view being focused at said small aperture so that said field of view lies entirely within said aperture and expands out of said aperture toward said rotor blades to produce said substantially rectangular field of view at said turbine rotor, wherein during operation of said pyrometer in said gas turbine engine at said operating conditions of said engine, said output signal strength from said radiation sensor means is representative of the real-time average radiance of said hottest parts of said integer number of blades, plus interference radiation due to any other sources of radiation within said field of view.

2. An optical radiation pyrometer according to claim 1, said integer number being betwen one and three inclusive.

3. An optical radiation pyrometer according to claim 1 said field of view embracing a major portion of said span of said blades.

4. An optical radiation pyrometer according to claim 1 in which said radiation sensor means comprises an optoelectronic sensor situated remotely from said optical system, and an optical guide having a receptor end onto which incoming radiation is concentrated by said optical system, said optical guide acting to channel radiation to said opto-electronic sensor.

5. An optical pyrometer according to claim 1 in which said optical system comprises said masking means and a lens for concentrating radiation from said turbine rotor blades onto said radiation-sensor means.

6. An optical radiation pyrometer according to claim 5 in which said masking means masks said lens.

7. A radiation pyrometer system adapted for installation in a gas turbine engine wherein said gas turbine engine has an annular wall for directing gases to the rotor blades of a turbine rotor, and a small aperture is formed in said annular wall, said radiation pyrometer system comprising:

an optical pyrometer positioned in said engine for receiving radiation from said rotor blades and including, a radiation sensor means for generating an output signal, and an optical means for direction radiation from said engine rotor blades onto said sensor means, said optical means including masking means for limiting the field of view of said radiation sensor means at said rotor blades to a substantially rectangular shape having edges extending substantially circumferentially and radially of said turbine rotor blades to cover an integer number of inter-blade passage widths and a sufficient radial span of the blades to ensure that the hottest portions thereof are within said field of view during a plurality of preselected operating conditions of said engine, said optical means being aligned with respect to said small aperture and the plane of said rotor turbine blades such that said field of view is filled by the surfaces of said blades, said field of view being focused at said small aperture so that said field of view lies entirely within said aperture and expands out of said aperture toward said rotor blades to produce said substantially rectangular field of view at said turbine rotor, wherein during operation of said pyrometer in said gas turbine engine at said operating conditions of said engine, said output signal strength from said radiation sensor means is representative of the real-time average radiance of said hottest parts of said integer number of blades, plus interference radiation due to any other sources of radiation within said field of view.

8. An optical radiation pyrometer according to claim 7 wherein said integer number is between 1 and 3, inclusive.

9. The radiation pyrometer system of claim 7 wherein said field of view embraces a major portion of said span of said blades.

10. The radiation pyrometer system of claim 7 wherein said radiation sensor means comprises an opto-electronic sensor positioned remotely from said optical system, and an optical guide having a receptor end onto which incoming radiation is concentrated by said optical system, said optical guide acting to channel radiation to said opto-electronic sensor.

11. The radiation pyrometer system of claim 7 wherein said optical system comprises said masking means and a lens for concentrating radiation from said turbine rotor blades onto said radiation-sensor means.

12. A radiation pyrometer system including an optical pyrometer in a gas turbine engine, said engine having an annular wall for directing gases to the rotor blades of a turbine rotor, and said optical pyrometer being positioned in said engine for receiving radiation from said rotor blades, said radiation pyrometer system comprising:
 a small aperture formed in said annular wall of said engine;
 a radiation sensor means for generating an output signal; and
 an optical means for directing radiation from said engine rotor blades onto said sensor means, said optical means including masking means for limiting the field of view of said radiation sensor means at said rotor blades to a substantially rectangular shape having edges extending substantially circumferentially and radially of said turbine rotor blades to cover an integer number of inter-blade passage widths and a sufficient radial span of the blades to ensure that the hottest portions thereof are within said field of view during a plurality of preselected operating conditions of said engine, said optical means being aligned with respect to said small aperture and the plane of said rotor turbine blades such that said field of view is filled by the surface of said blades, said field of view being focused at said small aperture so that said field of view lies entirely within said aperture and expands out of said aperture toward said rotor blades to produce said substantially rectangular field of view at said turbine rotor, wherein during operation of said pyrometer in said gas turbine engine at said operating conditions of said engine, said output signal strength from said radiation sensor means is representative of the realtime average radiance of said hottest parts of said integer number of blades, plus interference radiation due to any other sources of radiation within said field of view.

13. A radiation pyrometer system according to claim 12 wherein said integer number is between 1 and 3, inclusive.

14. A radiation pyrometer system according to claim 12 wherein said the field of view embraces a major portion of said span of said blades.

15. The radiation pyrometer system of claim 12 wherein said radiation sensor means comprises an opto-electronic sensor situated remotely from said optical system and an optical guide having a receptor end onto which incoming radiation is concentrated by said optical system, said optical guide acting to channel radiation to said opto-electronic sensor.

16. An optical radiation pyrometer according claim 12 in which said optical radiation system comprises said masking means and a lens for concentrating radiation from said turbine rotor blades onto said radiation-sensor means.

* * * * *